US011571875B2

(12) United States Patent
Silvia (10) Patent No.: US 11,571,875 B2
(45) Date of Patent: Feb. 7, 2023

(54) THREE-DIMENSIONAL REINFORCED MEMBRANE

(71) Applicant: COOLEY GROUP HOLDINGS, INC., Pawtucket, RI (US)

(72) Inventor: Justin J. Silvia, Fall River, MA (US)

(73) Assignee: COOLEY GROUP HOLDINGS, INC., Pawtucket, RI (US)

( * ) Notice: Subject to any disclaimer, the term of this patent is extended or adjusted under 35 U.S.C. 154(b) by 211 days.

(21) Appl. No.: 15/582,440

(22) Filed: Apr. 28, 2017

(65) Prior Publication Data

US 2017/0313027 A1 Nov. 2, 2017

Related U.S. Application Data

(60) Provisional application No. 62/329,466, filed on Apr. 29, 2016.

(51) Int. Cl.
| | |
|---|---|
| B32B 7/12 | (2006.01) |
| B32B 5/02 | (2006.01) |
| B32B 37/12 | (2006.01) |
| D03D 11/02 | (2006.01) |
| B32B 37/24 | (2006.01) |

(Continued)

(52) U.S. Cl.
CPC ............... *B32B 7/12* (2013.01); *B32B 5/022* (2013.01); *B32B 5/024* (2013.01); *B32B 5/026* (2013.01); *B32B 5/26* (2013.01); *B32B 27/08* (2013.01); *B32B 27/12* (2013.01); *B32B 27/40* (2013.01); *B32B 37/12* (2013.01); *B32B 37/24* (2013.01); *D03D 11/02* (2013.01); *D03D 15/283* (2021.01); *B32B 2037/243* (2013.01); *B32B 2250/40* (2013.01); *B32B 2255/02* (2013.01); *B32B 2255/26* (2013.01); *B32B 2262/0215* (2013.01); *B32B 2262/0261* (2013.01); *B32B 2262/0269* (2013.01); *B32B 2262/0276* (2013.01); *B32B 2262/10* (2013.01); *B32B 2262/101* (2013.01); *B32B 2262/106* (2013.01); *B32B 2262/14* (2013.01); *B32B 2305/18* (2013.01); *B32B 2307/308* (2013.01); *B32B 2307/71* (2013.01); *B32B 2307/712* (2013.01); *B32B 2307/714* (2013.01); *B32B 2307/7145* (2013.01);

(Continued)

(58) Field of Classification Search
USPC .......................................................... 442/59
See application file for complete search history.

(56) References Cited

U.S. PATENT DOCUMENTS

| | | | |
|---|---|---|---|
| 4,910,906 A | 3/1990 | Schefers et al. | |
| 5,178,938 A * | 1/1993 | Magistro | B32B 7/12 442/261 |

(Continued)

FOREIGN PATENT DOCUMENTS

| | | |
|---|---|---|
| WO | 2007070657 A2 | 6/2007 |
| WO | 2009039516 A1 | 3/2009 |

OTHER PUBLICATIONS

Burchardt et al., Handbook of Adhesives and Sealants vol. 2, 2006, Elsevier, Chapter 6, pp. 409-417 (Year: 2006).*

*Primary Examiner* — Vincent Tatesure
(74) *Attorney, Agent, or Firm* — Lando & Anastasi, LLP (57) ABSTRACT

A three-dimensional reinforced membrane is designed to be inflated and used in various structural applications. A drop-stitch or double wall fabric may be reinforced with one or more coatings, such as urethane-based coatings, and may also be laminated in accordance with various disclosed embodiments.

17 Claims, 7 Drawing Sheets

(51) Int. Cl.
  *B32B 27/08* (2006.01)
  *B32B 27/40* (2006.01)
  *B32B 5/26* (2006.01)
  *B32B 27/12* (2006.01)
  *D03D 15/283* (2021.01)

(52) U.S. Cl.
  CPC ...... *B32B 2605/18* (2013.01); *D10B 2331/02* (2013.01); *D10B 2403/021* (2013.01)

(56) References Cited

U.S. PATENT DOCUMENTS

| | | | |
|---|---|---|---|
| 5,317,983 | A | 6/1994 | Strifors et al. |
| 5,603,647 | A | 2/1997 | Van Adrichem et al. |
| 5,868,095 | A | 2/1999 | Zeromski et al. |
| 5,993,585 | A | 11/1999 | Goodwin et al. |
| 6,119,371 | A | 9/2000 | Goodwin et al. |
| 6,709,752 | B1 * | 3/2004 | James ............... C09D 183/04 427/387 |
| 7,234,183 | B2 | 6/2007 | Elrod et al. |
| 7,254,853 | B1 | 8/2007 | Kim |
| 7,259,115 | B2 * | 8/2007 | Panse ............... B32B 7/12 442/66 |
| 7,530,321 | B2 | 5/2009 | Dingel et al. |
| 7,552,694 | B2 | 6/2009 | Dingel et al. |
| 7,861,662 | B2 | 1/2011 | Rista |
| 7,992,511 | B2 | 8/2011 | Chon |
| 8,082,871 | B2 | 12/2011 | Czarnowski et al. |
| 8,286,573 | B2 | 10/2012 | Hoge, Jr. |
| 8,800,466 | B1 | 8/2014 | Shimozono et al. |
| 9,067,656 | B2 | 6/2015 | Rasmussen et al. |
| 9,114,862 | B2 | 8/2015 | Dingel |
| 2006/0174417 | A1 | 8/2006 | Elrod et al. |
| 2007/0131155 | A1 | 6/2007 | Dingel |
| 2008/0000029 | A1 | 1/2008 | Feingold et al. |
| 2011/0303139 | A1 | 12/2011 | Hoge, Jr. |
| 2012/0009832 | A1 | 1/2012 | Rawlings-Lloyd |
| 2012/0276798 | A1 * | 11/2012 | Chai ............... B32B 27/12 442/394 |
| 2014/0087610 | A1 | 3/2014 | Rasmussen et al. |
| 2014/0364022 | A1 | 12/2014 | Dingel |

* cited by examiner

THREE-DIMENSIONAL REINFORCED MEMBRANE

CROSS REFERENCE TO RELATED APPLICATIONS

This application claims priority under 35 U.S.C. § 119(e) to U.S. Provisional Application Ser. No. 62/329,466 titled "THREE-DIMENSIONAL REINFORCED MEMBRANE," filed Apr. 29, 2016, which is incorporated herein by reference in its entirety.

BACKGROUND OF THE DISCLOSURE

The present disclosure is related to three-dimensional reinforced membranes, such as those used in the manufacture of inflatable products, among other applications.

The present disclosure is also related to a method for manufacturing a three-dimensional reinforced membrane. Coatings can be applied using various methods that are known in the art. For example, one or more coatings can be applied using knife coating, Meyer Rod coating, slot die coating (or die slot coating), spraying, and/or roll coating or lamination. Layers and/or coatings can also be formed through extrusion.

SUMMARY

The present disclosure provides a three-dimensional reinforced membrane, also known as a dropstitch or double wall fabric. The present disclosure also provides a method for manufacturing a three-dimensional reinforced membrane.

In accordance with one or more aspects of the present disclosure, a three-dimensional membrane may include a dropstitch fabric having a first side and a second side; and a first coating applied to at least one of the first and second sides of the dropstitch fabric.

In some embodiments, the dropstitch fabric includes nylon, polyester, and/or fiberglass.

In some embodiments, the first coating includes a urethane-based material.

In some embodiments, a second coating is applied to the first coating.

In some embodiments, a laminated substrate is applied to the second coating.

In some embodiments, the laminated substrate includes a first extruded film; a second extruded film; and a fabric layer between the first extruded film and the second extruded film.

In some embodiments, the laminated substrate includes an extruded film; and a fabric layer in adjacent relation with the extruded film.

In some embodiments, the second coating includes an extruded film.

In some embodiments, the dropstitch fabric includes nylon 66 fabric.

According to another aspect of the present disclosure, an inflatable device includes a three-dimensional reinforced membrane of the present disclosure.

According to another aspect of the present disclosure, a method of forming a three-dimensional membrane includes providing a drop stitch fabric having a first side and a second side; and applying a first coating to at least one of the first and second sides of the dropstitch fabric.

In some embodiments, the dropstitch fabric includes at least one of nylon, polyester, and fiberglass, wherein the first coating includes a urethane-based material.

In some embodiments, the method further includes applying a second coating to the first coating, forming a laminated substrate, and applying the laminated substrate to the second coating.

In some embodiments, forming the laminated substrate includes providing a fabric layer; coating a first side of the fabric layer and with a solvent based reactive urethane coating to form a coated first side of the fabric layer; coating a second side of the fabric layer and with a solvent based reactive urethane coating to form a coated second side of the fabric layer; extruding a first film; applying the first film to the coated first side of the fabric layer; extruding a second film; and applying the second film to the coated second side of the fabric layer.

In some embodiments, forming the laminated substrate includes providing a fabric layer; coating a first side of the fabric layer and with a solvent based reactive urethane coating to form a coated first side of the fabric layer; extruding a film; and applying the film to the coated first side of the fabric layer.

In some embodiments, the second coating is formed by extruding a film.

In some embodiments, the dropstitch fabric includes nylon 66 fabric.

According to another aspect of the present disclosure, a three-dimensional membrane includes a dropstitch fabric having a first side and a second side; a first adhesive coating applied to the first side of the dropstitch fabric; a first extruded film applied to the first adhesive coating, the first adhesive coating being positioned between the first side of the dropstitch fabric and the first extruded film; a first laminated substrate adhered to the first extruded film, the first laminated substrate including a first outer extruded film and a first fabric layer in adjacent relation with the first outer extruded film, an outer surface of the first outer extruded film forming a first outer surface of the three-dimensional membrane; a second adhesive coating applied to the second side of the dropstitch fabric; a second extruded film applied to the second adhesive coating, the second adhesive coating being positioned between the second side of the dropstitch fabric and the second extruded film; and a second laminated substrate adhered to the second extruded film, the second laminated substrate including a second outer extruded film and a second fabric layer in adjacent relation with the second outer extruded film, an outer surface of the second outer extruded film forming a second outer surface of the three-dimensional membrane.

In some embodiments, the first laminated substrate further includes a first inner extruded film, the first inner extruded film being positioned between the first fabric layer and the first extruded film; and the second laminated substrate further includes a second inner extruded film, the second inner extruded film being positioned between the second fabric layer and the second extruded film.

In some embodiments, the dropstitch fabric includes at least one of nylon, polyester, and fiberglass.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

In accordance with one or more embodiments, a three-dimensional reinforced membrane is provided. The disclosed membranes may also be referred to as dropstitch or double wall fabric as will be generally recognized by those skilled in the relevant art. In some embodiments, a dropstitch or double wall fabric may be coated and/or laminated for reinforcement. The disclosed reinforced membranes may generally be inflatable and used in various structural applications as described herein. In at least some embodiments, articles manufactured with the disclosed membranes may be inflated to pressures up to about 45 pounds per square inch (psi). The disclosed membranes may also exhibit superior screw puncture and tensile strength in comparison to conventional materials.

In accordance with one or more embodiments, first and second pieces of fabric may be joined together in a spaced apart relationship. The first and second pieces of fabric may be made of any material such as, but not limited to, nylon, polyester, fiberglass, a para-aramid synthetic fiber such as Kevlar® (a registered trademark of E. I. du Pont de Nemours and Company) and its variants, elastomeric yarns, carbon, basalt or in any combination thereof. The material of the first and/or second pieces of fabric should generally be compatible with other materials that may contact the fabric, including a coating material, such as urethane, as described herein.

In accordance with one or more embodiments, the first and second pieces of fabric may be referred to as foundation layers. In at least some non-limiting embodiments, the foundation layers may generally have a construction of at least 9 ends per inch (epi) by 9 picks per inch (ppi) although the construction may vary. The first and/or second pieces of fabric may be woven or knitted. In at least some embodiments, the first and/or second pieces of fabric may be nonwoven. The foundation layers may be secured together in a spaced apart relationship with a yarn or thread made of a similar material. The two layers may be secured together at the time of weaving the upper and lower fabrics. The thread should generally be strong, durable, and have little stretch. In at least some embodiments, the yarn or thread may be a fine polyester thread.

Table 1 shows typical properties for an example of dropstitch fabric that can be used in various embodiments of the three-dimensional reinforced membranes of the present disclosure. In particular, Table 1 shows properties for Drop Stitch 67 millimeter height 420d/630d Nylon 66 fabric. That is, the body of the fabric uses two different denier yarns, 420d in the warp and 630d in the fill. In some embodiments, the fabric uses two different yarns, other than these. In accordance with various embodiments, the disclosed materials may generally be compliant with relevant provisions of the Berry Amendment relating to clothing, fabrics, fibers, and yarns.

TABLE 1

| Style | | 11-30 W-12_67 mm | |
|---|---|---|---|
| Weave Pattern ID | | 1013 | |
| YARNS | Warp | Weft | Drop Yarns |
| Composition-Polyamide | Nylon 6.6 | Nylon 6.6 | Nylon 6.6 |
| Yarn Denier | 420d | 630d | 420d |
| Yarn twist | 3Z | 3Z | 3Z |
| elongation @ break % | 21 | 21 | 21 |
| tenacity (grams/denier) | 8.3 | 9.1 | 8.3 |
| Density, per cm | 22 | 12 | * |
| WEAVE | | | |
| Width, m (in) | 1.45 meters | | 57 in |
| total width, m (in) | 1.5 meters | | 59 in |
| Drop Yarn Height, mm | 66.7 meters | | 2.6 in |
| Pile Density (drop yarns) | | 55172 | |
| | | *drop yarns per sq meter (density) | |
| Pile Density (drop yarns) | | 36 | |
| | | *drop yarns per square inch (density) | |
| FABRIC WEIGHT (ESTIMATE) | | | LINEAR METER |
| Total Fabric Wt (grams) | 628 g/sq · m cloth | | 911 g/linear meter |
| Total Fabric Wt (oz) | 22 oz/sq · m cloth | | 32 oz/linear meter |
| Total Fabric Wt (lb) | 1.4 lb/sq · m cloth | | 2.0 lb/linear meter |

The foundation layers may be sewn together with a continuous, substantially evenly spaced thread, back and forth between the first and second pieces of fabric. This sewing technique may generally be referred to as drop stitching or quilting by those skilled in the relevant art. Dropstitches may be added at the time of weaving and quilting may be performed with two separate layers of fabric. The dropstitching may be relatively uniform between the foundation layers at any desired density to impart strength and durability. Stitch density and spacing may factor into the surface appearance of the finished product. Low density/long spacing may result in a button-like effect while high density/short spacing may generally result in a more uniform, smoother appearance. The spacing between foundation layers may generally be between about two and about twenty inches depending on the intended application. In some specific but non-limiting embodiments, fabrics with a dropstitch spacing of between about 1.5 and 7 inches may be implemented. In at least some embodiments, the foundation layers may be woven in parallel while the drop stitching is also formed in order to produce the double wall fabric. In other embodiments, the foundation layers may first be manufactured and then the dropstitching may be performed to produce the double wall fabric.

The weight range of the resulting double wall or dropstitch fabric may generally be about 5 to about 40 ounces per square yard. The dimensions of the resulting double wall or dropstitch fabric may generally be about 50 to about 200 inches in width. Loom limitations may result in a perimeter, such as a one to three inch border area, that does not include drop stitching and this material may be sacrificed prior to further processing or subsequent article manufacture.

In accordance with one or more embodiments, a double wall or dropstitch fabric may generally be reinforced. The reinforcement may be for air retention only or to impart added strength as well as air retention. The resulting product may be referred to as a three-dimensional reinforced membrane. In at least some embodiments, the double wall or dropstitch fabric may be coated and/or laminated as described herein to impart the reinforcement. A coating operation may involve methods including, but not limited to, aqueous coatings, solvent coatings, hot melt, plastisol, film sheet, extrusion, calendering, and lamination. One or more coatings may be applied to one or both of the foundation layers. The related chemistry can include, but is not limited to, coatings involving thermoplastic polyurethane (TPU), polyvinyl chloride (PVC), synthetic rubbers (CSM) such as chlorosulfonated polyethylene (CSPE), reactive polyurethane (PUR), ethylene-vinyl acetate (EVA), polyethylene terephthalate (PET), and synthetic polymers, such as aliphatic or semi-aromatic polyamides including nylon. In at least some specific, non-limiting embodiments, the disclosed reinforced membranes may include a urethane-based coating.

In accordance with one or more embodiments, an aqueous or solvent-based coating, such as a plastisol coating, may be applied via a transfer or direct coating method. For example, a knife or blade technique as commonly known to those skilled in the coating arts may be implemented. Alternatively, a Meyer rod approach may be implemented for the coating operation.

In accordance with one or more other embodiments, a hotmelt or extrusion process may be used for a coating operation. Likewise, a die or slot applicator, spray applicator, roll coating, or lamination process may be used for reinforcement. In general, one or more of these approaches may involve pre-melting resin or adhesive prior to application.

In accordance with one or more specific embodiments, a PUR coated double wall fabric may be extrusion coated for reinforcement. In the first step in the process, a urethane coated dropstitch fabric may be produced. A double wall fabric may be coated on each side with, for example, about one to three ounces per square yard of a solvent based reactive urethane coating. The coating may be dried prior to further processing. The next step may involve extrusion coating with a film, such as a thermoplastic urethane film. For example, between about four and ten ounces per square yard of urethane may be applied to a pre-coated fabric. This may be repeated for the other side (second foundation layer) of the coated fabric as well. The film may be formulated to provide heat stability, UV resistance, antimicrobial resistance, weatherability, and/or chemical resistance to the reinforced membrane.

In accordance with one or more other specific embodiments, a PUR coated double wall fabric may be extrusion coated and then a laminated reinforcement may be applied. In the first step of the process similar to above, a urethane coated dropstitch fabric may be produced. A double wall fabric may be coated on each side with, for example, about one to three ounces per square yard of a solvent based reactive urethane coating. The coating may be dried prior to further processing. Drying conditions may be dependent on the coatings used. For solvent coatings, low temperatures are favored to facilitate the removal of solvent only, while for aqueous coatings higher temperatures are needed due to the higher heat capacity of water. Time and temperature may also be impacted by the equipment heating type (air, infrared, etc.), number of drying zones, length of drying zones, and air flow within the drying zones. The dried, coated dropstitch fabric may optionally be rolled prior to lamination. The next step may involve extrusion and lamination. An extruded thermoplastic urethane film, for example, between about four to about ten ounces per square yard, may be applied to the coated dropstitch fabric. A laminate substrate may then be introduced over the extruded film as the top layer to form a composite reinforced membrane. The laminate substrate may be, but not limited to, any of the following: another double wall fabric, a composite membrane such as those commercially available from Cooley/Engineered Membranes, or other similar functional reinforcement. The extrusion and lamination processes may then be repeated for the other side (second foundation layer) of the pre-coated dropstitch fabric.

In accordance with various embodiments, the dropstitch fabric may be coated with a tie layer on both sides. An extrusion layer may be applied to either produce a finished product or act as an intermediate layer to facilitate the addition of a laminated substrate. A laminated substrate may be associated with a final step in the manufacturing of a finished product.

Figure 1:
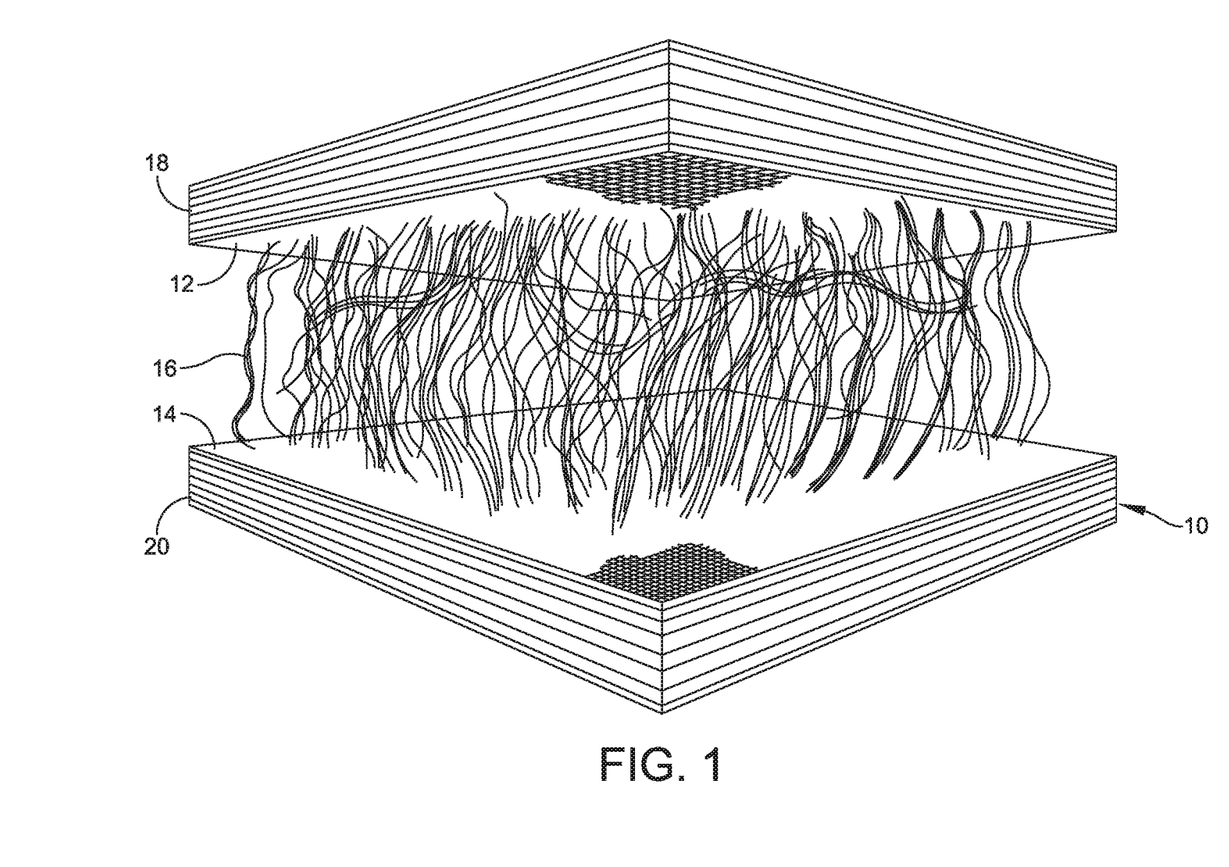
FIG. 1 is an enlarged view of a three-dimensional reinforced membrane.

FIG. 1 presents an expanded view of a three-dimensional reinforced membrane in accordance with one or more embodiments with exposed dropstitching. FIG. 1 shows a dropstitch assembly 10 having a first fabric layer 12, a second fabric layer 14, and dropstitching 16 extending between the first fabric layer 12 and the second fabric layer 14. The first fabric layer 12 and the second fabric layer 14 are in spaced apart facing relation so they define a space between the first fabric layer 12 and the second fabric layer 14. The first fabric layer 12 is secured by an adhesive to a first support structure 18. Similarly, the second fabric layer 14 is secured by an adhesive to a second support structure 20.

Figure 2:
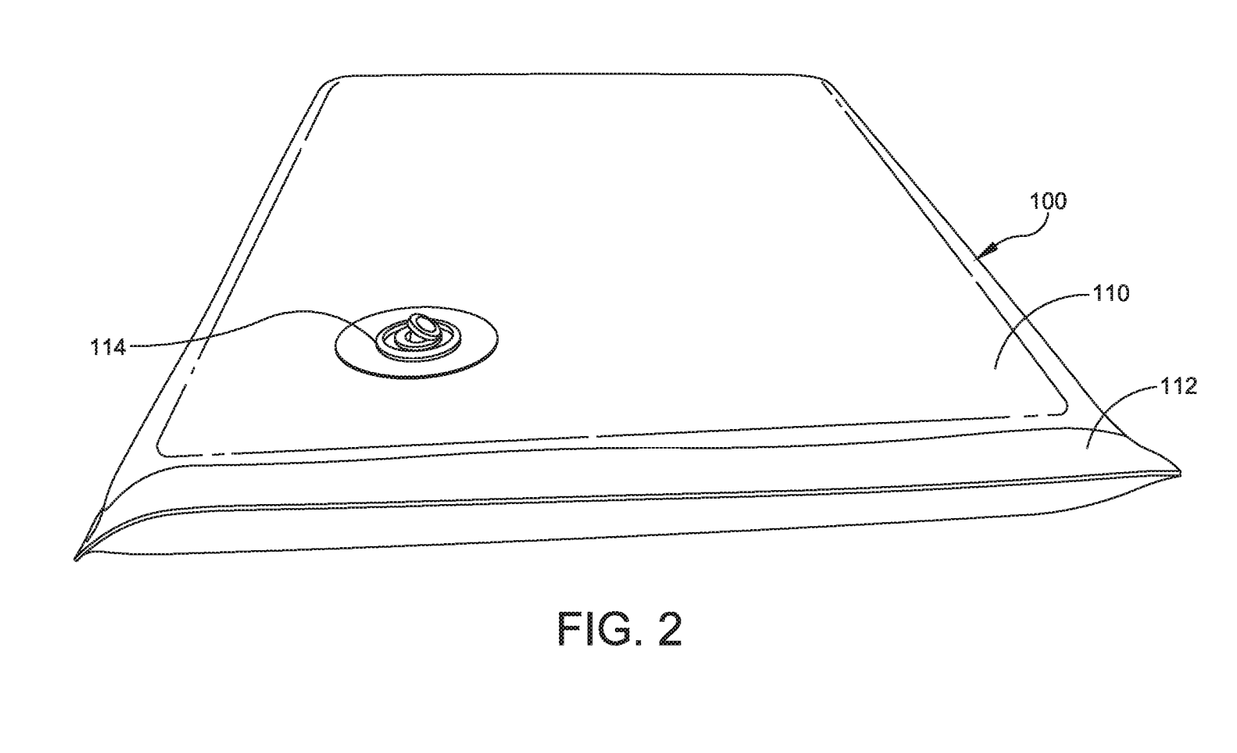
FIG. 2 is a view of an inflatable article.

FIG. 2 shows an inflatable article 100. The inflatable article 100 has a coated dropstitch material 110 and seam tape 112 extending along an edge of the dropstitch fabric 110. The dropstitch material 110 can be a material according to any of the embodiments described herein, such as the coated and/or laminated materials of FIGS. 4-7 discussed further below. A valve 114 is accessible from the outer surface of the dropstitch material 110, and a valve port in the valve 114 extends through one of the fabric layers of the dropstitch material 110. The valve 114 can be selectively opened by a user to inflate or deflate the inflatable article 100, and can be selectively closed by a user to seal the inflatable article 100.

When the dropstitch fabric is used alone, such as to form an inflatable article, it may require a side wall which can be a single layer of reinforced material according to some embodiments of the present disclosure. In some non-limiting embodiments, the side wall material may weigh about 40 ounces per square yard. Where the dropstitch fabric may instead be attached to a tube of an inflatable boat, for example, the dropstitch fabric may be welded or glued to the tube of the inflatable boat, and then a seam tape or rubstrake may be welded or glued over the seam.

FIGS. 3-7 show additional schematic views of various potential combinations for reinforced dropstitch fabrics having different coatings/extrusions and laminations in accordance with one or more embodiments.

Figure 3:
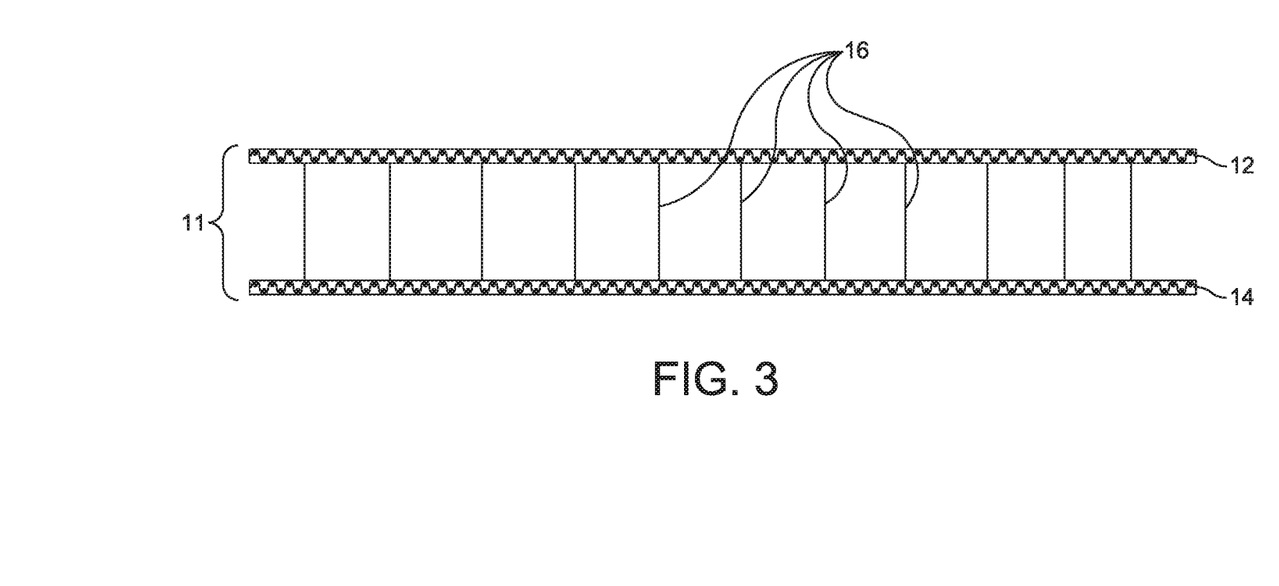
FIG. 3 is a cross-sectional view of a dropstitch fabric.

FIG. 3 shows a dropstitch fabric 11. The dropstitch fabric 11 has a first fabric layer (first foundational layer) 12, and a second fabric layer (second foundational layer) 14, and dropstitching 16 extending between the first fabric layer 12 and the second fabric layer 14. This dropstitch fabric 11 can be coated and/or laminated as shown in FIGS. 4-7.

Figure 4:
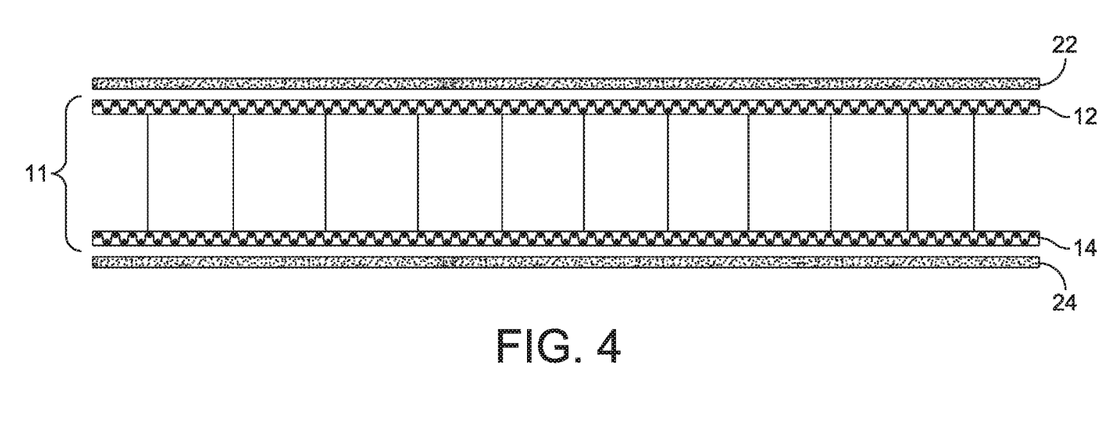
FIG. 4 is a cross-sectional view of an adhesive tie-coated dropstitch fabric.

FIG. 4 shows an adhesive tie-coated dropstitch fabric. The embodiment of FIG. 4 includes the dropstitch fabric 11 of FIG. 3, reinforced as described herein. A first adhesive coating layer 22 is applied so that it extends over the first fabric layer 12. The first adhesive coating layer 22 is in directly adjacent facing relation with the first fabric layer 12. A second adhesive coating layer 24 is applied so that it extends over the second fabric layer 14. The second adhesive coating layer 24 is in directly adjacent facing relation with the second fabric layer 14.

In some embodiments, the first adhesive coating layer 22 may be a solvent based reactive urethane film, between one and three ounces per square yard, including the endpoints of the range. Similarly, in some embodiments, the second adhesive coating layer 24 may be a solvent based reactive urethane film, between one and three ounces per square yard, including the endpoints of the range.

Figure 5:
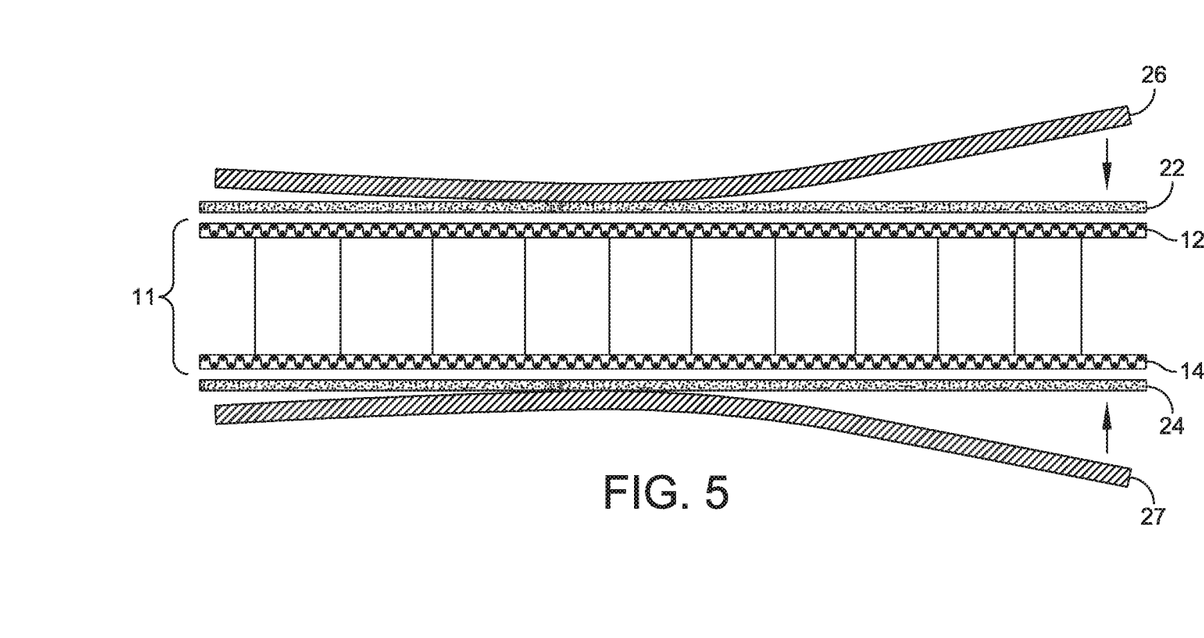
FIG. 5 is a cross-sectional view of an extrusion coated dropstitch fabric.

FIG. 5 shows an extrusion coated dropstitch fabric. FIG. 5 includes the reinforced structure of FIG. 4, and extruded film being secured to the adhesive layers. A first extruded film 26 is being placed onto the first adhesive coating layer 22, so that the first extruded film 26 is adhesively secured to the first fabric layer 12. Similarly, a second extruded film 27 is being placed onto the second adhesive coating layer 24, so that the second extruded film 27 is adhesively secured to the second fabric layer 14.

In some embodiments, the first extruded film 26 is an extruded urethane film between four and ten ounces per square yard, including the endpoints of the range. Similarly, in some embodiments, the second extruded film 27 is an extruded urethane film between four and ten ounces per square yard, including the endpoints of the range.

While FIGS. 4 and 5 are shown in a partially exploded view, it is to be understood that the first adhesive coating 22 is in directly adjacent facing relation with the first fabric layer 12 and the second adhesive coating 24 is in directly adjacent facing relation with the second fabric layer 14 when the first adhesive coating 22 and the second adhesive coating 24 are applied to the dropstitch fabric 11. Similarly, it is to be understood that the first extruded film 26 is in directly adjacent facing relation with the first adhesive coating layer 22 and the second extruded film 27 is in directly adjacent facing relation with the second adhesive coating layer 24 when the first extruded film 26 and the second extruded film 27 are adhesively secured to the dropstitch fabric 11.

Figure 6:
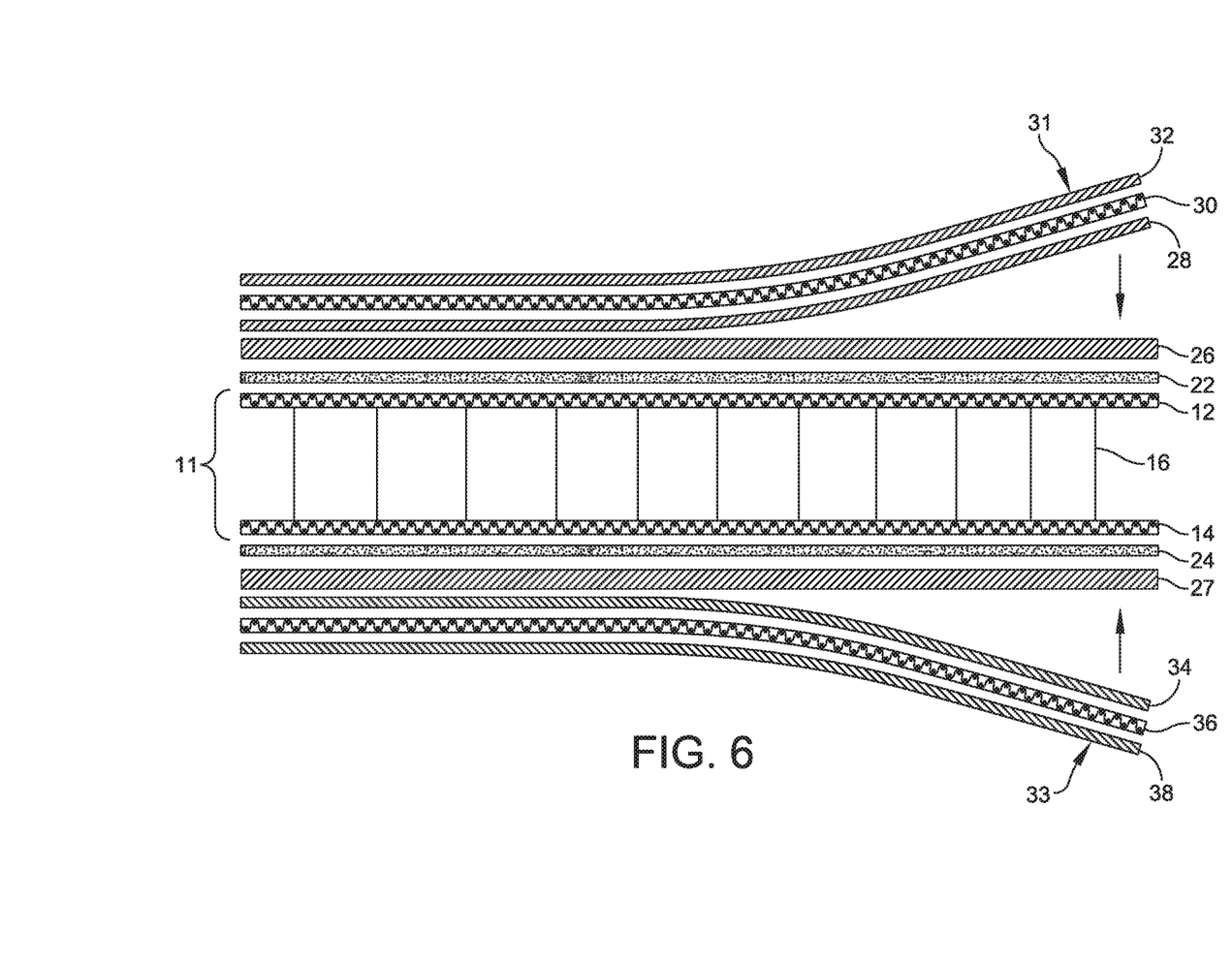
FIG. 6 is a cross-sectional view of an embodiment of a laminated dropstitch fabric.
Figure 7:
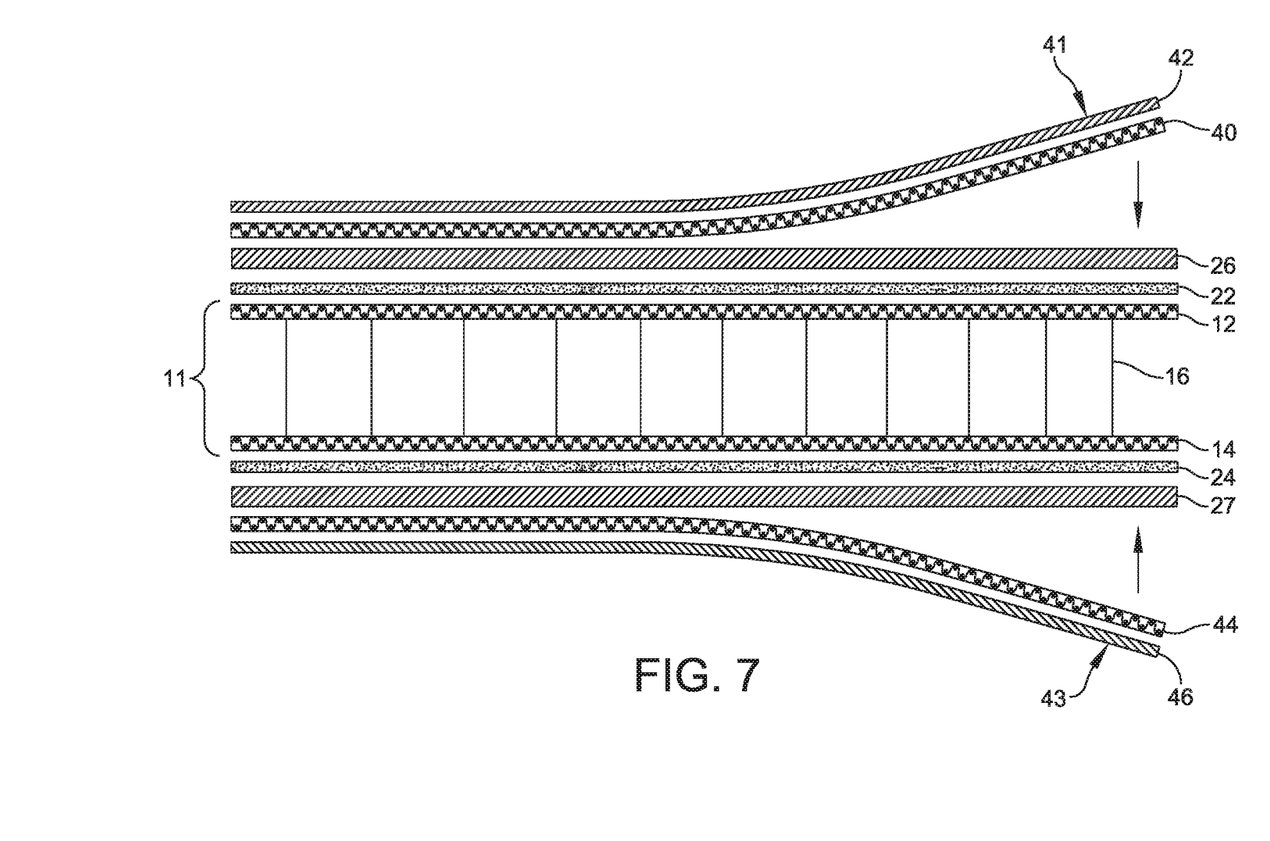
FIG. 7 is a cross-sectional view of another embodiment of a laminated dropstitch fabric.

FIGS. 6 and 7 show embodiments of laminated dropstitch fabrics. FIG. 6 shows a first embodiment of a laminated dropstitch fabric. A double walled dropstitch fabric 11 has a first adhesive coating layer 22 extending over the first fabric layer 12 on a first side of the dropstitch fabric 11 and a second adhesive coating layer 24 extending over the second fabric layer 14 on a second side of the dropstitch fabric 11. A first extruded film 26 extends over the first adhesive coating layer 22, so that the first extruded film 26 is adhesively secured to the first fabric layer 12. Similarly, a second extruded film 27 extends over the second adhesive coating layer 24, so that the second extruded film 27 is adhesively secured to the second fabric layer 14. As discussed herein, an adhesive tie coat may be applied to adhere extruded film to fabric. In at least some embodiments, the adhesive tie coat is a reactive urethane intended to be hydrolytically and thermally stable.

A first laminated substrate layer 31 is shown being adhered, or otherwise secured, to the first extruded film 26. The first laminated substrate layer 31 includes an inner extruded film 28 and an outer extruded film 32. In some embodiments, a fabric layer 30 is secured between the inner extruded film 28 and the outer extruded film 32 by a tie coat, as well as by the temperature and pressure associated with extrusion. The inner extruded film 28 is adhered to the first extruded film 26. Similarly, a second laminated substrate layer 33 is shown being adhered, or otherwise secured, to the second extruded film 27. The second laminated substrate layer 33 includes an inner extruded film 34 and an outer extruded film 38. In some embodiments, a fabric layer 36 is secured between the inner extruded film 34 and the outer extruded film 38 by a tie coat, as well as by the temperature and pressure associated with the extrusion operation. The inner extruded film 34 is adhered to the second extruded film 27.

FIG. 7 shows a second embodiment of a laminated dropstitch fabric. A double walled dropstitch fabric 11 has a first adhesive coating layer 22 extending over the first fabric layer 12 and a second adhesive coating layer 24 extending over the second fabric layer 14. A first extruded film 26 extends over the first adhesive coating layer 22, so that the first extruded film 26 is adhesively secured to the first fabric layer 12. Similarly, a second extruded film 27 extends over the second adhesive coating layer 24, so that the second extruded film 27 is adhesively secured to the second fabric layer 14.

A first laminated substrate layer 41 is shown being secured to the first extruded film 26. The first laminated substrate layer 41 includes outer extruded film 42 secured to and extending over a fabric layer 40. The fabric layer 40 is adhered to the first extruded film 26. Similarly, a second laminated substrate layer 43 is shown being secured to the second extruded film 27. The second laminated substrate layer 43 includes outer extruded film 46 secured to and extending over a fabric layer 44. The fabric layer 44 is adhered to the second extruded film 27.

While FIGS. 6 and 7 are shown in a partially exploded view, it is to be understood that the first adhesive coating 22 is in directly adjacent facing relation with the first fabric layer 12 and the second adhesive coating 24 is in directly adjacent facing relation with the second fabric layer 14 when the first adhesive coating 22 and the second adhesive coating 24 are applied to the dropstitch fabric 11. Similarly, it is to be understood that the first extruded film 26 is in directly adjacent facing relation with the first adhesive coating layer 22 and the second extruded film 27 is in directly adjacent facing relation with the second adhesive coating layer 24 when the first extruded film 26 and the second extruded film 27 are adhesively secured to the dropstitch fabric 11.

In accordance with one or more embodiments, the disclosed three-dimensional reinforced membranes may offer physical property advantages including improved tensile strength, puncture resistance, and air retention. The design(s) of the present disclosure may also provide a dropstitch product that is weldable and compatible with fabricators using thermoplastic materials, thus eliminating the need for glues and epoxies in the assembly process.

In accordance with one or more embodiments, the three-dimensional reinforced membranes may generally be used for the manufacture of various articles. In at least some embodiments, the disclosed membranes may find particular applicability in the manufacture of inflatables, such as watercraft and other floatation devices. In some embodiments, the membranes may be used to construct boats and/or components thereof, including tubes and floors for boats. Paddleboards may also be manufactured using the disclosed membranes. Other embodiments may relate to the manufacture of various bladders, such as for use in footwear, docks, and mattresses. Various embodiments may find utility in military and aeronautic applications. Other inflatable structures, such as but not limited to shelters and bridges may also be manufactured with the disclosed materials. Welding can be accomplished with radio frequency (RF), hot air, wedge, and other welding techniques commonly used in the relevant art. The disclosed materials are also compatible with gluing techniques commonly used with rubber membranes, while offering an opportunity to minimize or eliminate use of solvent based glues.

The function and advantages of these and other embodiments will be more fully understood from the following non-limiting example. The example is intended to be illustrative in nature and is not to be considered as limiting the scope of the embodiments discussed herein.

EXAMPLE

The physical properties of various engineered membranes were compared and the data is presented below in Table 2. The first two columns are related to extrusion coated membranes, without lamination. The first column is related to a membrane that was less dense with respect to dropstitching. The third and fourth columns are related to an extrusion coated and laminated membrane. As illustrated, the laminated reinforcement applied to the double wall fabric imparted superior screw puncture (about 230 lbs vs about 150 lbs) and tensile strength (about 500×600 lbs/inch vs about 300×200 lbs/inch) when compared to two conventional dropstitch materials. The NP10002 sample used a different fabric than the NP14008B, resulting in different screw puncture force values.

In some embodiments, the fabric layer 30 and the fabric layer 36 may be made of any material such as, but not limited to, nylon, polyester, fiberglass, a para-aramid synthetic fiber such as Kevlar® (a registered trademark of E. I. du Pont de Nemours and Company) and its variants, elastomeric yarns, carbon, basalt or in any combination thereof.

In some embodiments, the first extruded film 26, the inner extruded film 28, and the outer extruded film 32 are made of the same material. In some embodiments, the second extruded film 27, the inner extruded film 34, and the outer extruded film 38 are made of the same material.

In some embodiments, the fully formed first laminated substrate layer 31 is applied to the first extruded film 26 as the first extruded film 26 is being extruded.

In some embodiments, the fully formed second laminated substrate layer 33 is applied to the second extruded film 27 as the second extruded film is being extruded.

It is to be appreciated that embodiments of the materials, methods, and articles of manufacture discussed herein are not limited in application to the details of construction and the arrangement of components set forth in this description or illustrated in the accompanying drawings. The disclosure is capable of implementation in other embodiments and of being practiced or of being carried out in various ways. Examples of specific implementations are provided herein

TABLE 2

|  | NP10002 Extrusion Coated | RD13002 Extrusion Coated | NP14008B Lot 14541 Extrusion Laminated | NP14008B Lot 17442 Extrusion Laminated | Comp. 1 (Zodiac) | Comp. 2 (Wonpoong (Korean)) |
| --- | --- | --- | --- | --- | --- | --- |
| Weight oz/sqyd | 62 | 45 | 70 | 66 | 64 | 74 |
| Coating Thickness | 14 | 14 | 12 | 12 | 20.5 | 24.3 |
| Coating Type | TPU | TPU | TPU | TPU | TPU | PVC |
| Fabric Count Warp × Fill | 52 × 16 | 60 × 27 | 60 × 27 | 55 × 30 | 27 × 28 | 15 × 16 |
| Stitch Height | 3.5 | 2.5 | 2.5 | 2.5 | 2.5 | 3.6 |
| RF Adhesion lbs/in | 38 | Fabric Break | 31 | 31 | 16 | 16 |
| Tape Adhesion lbs/2 in | NA | 40 | 54 | NA | NA | NA |
| Strip Tensile lbs/in Warp/Fill | 433/210 | 191/111 | 521/633 | 553/626 | 339/242 | 179/289 |
| Tongue Tear lbs/in Warp/Fill | 68/57 | 15/11 | 27/29 | 31/40 | 69/55 | 41/47 |
| Screw Puncture | 232 | NA | NA | 145 | 117 | 148 |

In some embodiments, the laminated reinforcement applied to the double wall fabric imparts screw puncture resistance in the range of 140 to 230 pounds. In some embodiments, the laminated reinforcement applied to the double wall fabric imparts tensile strength in the range of 300 to 500 pounds per inch in the warp direction. In some embodiments, the laminated reinforcement applied to the double wall fabric imparts tensile strength in the range of 200 to 600 pounds per inch in the fill direction.

for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present devices and methods or their components to any one positional or spatial orientation. Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An inflatable device, comprising:
   a three-dimensional reinforced membrane, including:
   a dropstitch fabric having a first side and a second side;
   a first tie coat comprising a solvent-based reactive adhesive applied to at least one of the first and second sides of the dropstitch fabric;
   a second tie coat comprising a solvent-based reactive adhesive applied to the first tie coat; and
   a laminated substrate applied to the second tie coat, the laminated substrate comprising a nylon fabric with a coated layer of thermoplastic polyurethane (TPU), wherein the inflatable device is inflatable to a pressure of up to about 45 pounds per square inch (psi).

2. The inflatable device of claim 1, wherein the three-dimensional membrane is characterized by a screw puncture resistance in the range of 140 to 230 pounds.

3. The inflatable device of claim 1, wherein the three-dimensional membrane is characterized by a tensile strength in the range of 300 to 500 pounds per inch in the warp direction and/or a tensile strength in the range of 200 to 600 pounds per inch in the fill direction.

4. The inflatable device of claim 1, wherein the second tie coat is formulated to provide heat stability, UV resistance, antimicrobial resistance, weatherability, and/or chemical resistance to the three-dimensional membrane.

5. The inflatable device of claim 1, wherein the dropstitch fabric comprises at least one of nylon, polyester, and fiberglass.

6. The inflatable device of claim 5, wherein the dropstitch fabric comprises nylon 66 fabric.

7. The inflatable device of claim 1, wherein the solvent-based reactive adhesive of the first tie coat comprises a urethane-based material.

8. The inflatable device of claim 1, wherein the laminated substrate comprises:
   a first extruded film;
   a second extruded film; and
   a fabric layer between the first extruded film and the second extruded film.

9. The inflatable device of claim 1, wherein the laminated substrate comprises:
   an extruded film; and
   a fabric layer in adjacent relation with the extruded film.

10. The inflatable device of claim 1, wherein the solvent-based reactive adhesive of the second tie coat comprises a urethane-based material.

11. An inflatable device, comprising:
    a three-dimensional membrane, including:
    a dropstitch fabric having a first side and a second side;
    a first tie coat comprising a solvent-based reactive adhesive applied to the first side of the dropstitch fabric;
    a second tie coat comprising a solvent-based reactive adhesive applied to the first tie coat, the first tie coat being positioned between the first side of the dropstitch fabric and the second tie coat;
    a first extruded film adhered to the second tie coat;
    a first laminated substrate adhered to the first extruded film, the first laminated substrate comprising a second outer extruded film and a first fabric layer in adjacent relation with the second outer extruded film, an outer surface of the second outer extruded film forming a first outer surface of the three-dimensional membrane;
    a third tie coat comprising a solvent-based reactive adhesive applied to the second side of the dropstitch fabric;
    a fourth tie coat comprising a solvent-based reactive adhesive applied to the third tie coat, the third tie coat being positioned between the second side of the dropstitch fabric and the fourth tie coat;
    a third extruded film adhered to the fourth tie coat; and
    a second laminated substrate adhered to the third extruded film, the second laminated substrate comprising a fourth outer extruded film and a second fabric layer in adjacent relation with the fourth outer extruded film, an outer surface of the fourth outer extruded film forming a second outer surface of the three-dimensional membrane, wherein the inflatable device is inflatable to a pressure of up to about 45 pounds per square inch (psi).

12. The inflatable device of claim 11, wherein the dropstitch fabric comprises at least one of nylon, polyester, and fiberglass.

13. The inflatable device of claim 12, wherein the dropstitch fabric comprises nylon 66 fabric.

14. The inflatable device of claim 11, wherein the three-dimensional membrane is characterized by a screw puncture resistance in the range of 140 to 230 pounds.

15. The inflatable device of claim 11, wherein the three-dimensional membrane is characterized by a tensile strength in the range of 300 to 500 pounds per inch in the warp direction and/or a tensile strength in the range of 200 to 600 pounds per inch in the fill direction.

16. The inflatable device of claim 11, wherein the second tie coat is formulated to provide heat stability, UV resistance, antimicrobial resistance, weatherability, and/or chemical resistance to the three-dimensional membrane.

17. The inflatable device of claim 11, wherein the solvent-based reactive adhesive of one or more of the tie coats comprises a urethane-based material.

* * * * *